(12) United States Patent
Harders et al.

(10) Patent No.: US 9,127,162 B2
(45) Date of Patent: Sep. 8, 2015

(54) USE OF ORGANOGELATOR DERIVATIVES IN BITUMINOUS COMPOSITIONS TO IMPROVE THE RESISTANCE OF SAME TO CHEMICAL STRESS

(75) Inventors: Sylvia Harders, Buchholz (DE); Laurence Lapalu, Villeurbanne (FR); Julien Chaminand, Vaulx en Velin (FR); Régis Vincent, Grygny (FR)

(73) Assignee: TOTAL RAFFINAGE MARKETING, Puteaux (FR)

( * ) Notice: Subject to any disclaimer, the term of this patent is extended or adjusted under 35 U.S.C. 154(b) by 15 days.

(21) Appl. No.: 13/643,237

(22) PCT Filed: Apr. 29, 2011

(86) PCT No.: PCT/IB2011/051908
§ 371 (c)(1),
(2), (4) Date: Oct. 24, 2012

(87) PCT Pub. No.: WO2011/135549
PCT Pub. Date: Nov. 3, 2011

(65) Prior Publication Data
US 2013/0041075 A1    Feb. 14, 2013

(30) Foreign Application Priority Data
Apr. 30, 2010   (EP) .................................... 10161698

(51) Int. Cl.
C08L 95/00 (2006.01)
C09D 195/00 (2006.01)
C08K 5/1575 (2006.01)
C08K 5/20 (2006.01)

(52) U.S. Cl.
CPC ............... *C08L 95/00* (2013.01); *C08K 5/1575* (2013.01); *C08K 5/20* (2013.01); *C08L 2555/50* (2013.01)

(58) Field of Classification Search
CPC . C08L 95/00; C08L 2555/50; C08L 2666/66; C08K 5/1575; C08K 5/20
USPC ................... 106/273.1, 284.4; 524/62, 68, 71
See application file for complete search history.

(56) References Cited

U.S. PATENT DOCUMENTS

| | | | |
|---|---|---|---|
| 5,883,162 A * | 3/1999 | Planche et al. ................... | 524/68 |
| 5,888,289 A | 3/1999 | Hendriks et al. | |
| 6,849,581 B1 * | 2/2005 | Thompson et al. ........... | 507/118 |
| 7,918,930 B2 * | 4/2011 | Lapalu et al. .............. | 106/284.4 |
| 8,188,293 B2 | 5/2012 | Tournilhac et al. | |
| 8,506,699 B2 * | 8/2013 | Chaverot et al. ........... | 106/281.1 |
| 2004/0102547 A1 | 5/2004 | Cowley et al. | |
| 2005/0187317 A1 | 8/2005 | Cowley et al. | |
| 2009/0025607 A1 | 1/2009 | Koenders et al. | |
| 2009/0062551 A1 | 3/2009 | Tournilhac et al. | |
| 2010/0192804 A1 | 8/2010 | Lapalu et al. | |
| 2011/0144242 A1 | 6/2011 | Chaverot et al. | |
| 2011/0319533 A1 * | 12/2011 | Gauthier et al. ................. | 524/71 |
| 2012/0214912 A1 | 8/2012 | Harders et al. | |
| 2012/0220700 A1 | 8/2012 | Harders et al. | |
| 2013/0036941 A1 * | 2/2013 | Harders et al. .............. | 106/284.4 |
| 2013/0298800 A1 * | 11/2013 | Lapalu et al. .............. | 106/281.1 |

FOREIGN PATENT DOCUMENTS

| | | |
|---|---|---|
| EP | 1572807 B1 | 10/2007 |
| FR | 2849047 B1 | 12/2005 |
| WO | WO-2005105926 A1 | 11/2005 |
| WO | WO 2007/012665 A1 * | 2/2007 |
| WO | WO 2008/107551 A2 * | 9/2008 |
| WO | WO 2009/101275 A1 * | 8/2009 |

OTHER PUBLICATIONS

Isare B., et al.; "The weak help the strong: Low-molar-mass organogelators harden bitumen;" Lamgmuir American Chemical Society USA, vol. 25, No. 15, Aug. 4, 2009; pp. 8400-8403.

Liu, Kefei F.; "Experimental Study on Epoxy Asphalt Binder;" Chinese Master's Theses Full-Text Database Engineering Science and Technology II, Section 12, 2008; 4 pages—pp. 13, 14, 15 and 62.

* cited by examiner

*Primary Examiner* — Helene Klemanski
(74) *Attorney, Agent, or Firm* — Harness, Dickey & Pierce, P.L.C.

(57) ABSTRACT

The disclosure includes the use in a bituminous composition of an organogelator derivative which has a molar mass no higher than 2,000 g/mol and includes at least one hydrogen bonds donor D, at least one hydrogen bonds acceptor A and at least one compatibilizer agent C in the bitumen, the compatibilizer agent C including a group selected among:

- at least one straight hydrocarbon chain including at least 4 carbon atoms, or
- at least one aliphatic cycle of 3 to 8 atoms, or
- at least one aromatic cycle, or
- at least one aliphatic or partly aromatic, or even entirely aromatic, condensed polycyclic system, each cycle including 5 or 6 atoms taken alone or as a mixture, to improve the resistance to aggressive chemical agents, in particular to hydrocarbons, such as gasolines, diesels and/or kerosenes, excluding N,N'-ethylene bis(stearamide) and excluding fatty-chains polyamines obtained by reacting polyalkylene fatty-chains polyamines of general formula (I) R—NH—(CH$_2$—CH$_2$—CH$_2$—NH)$_n$—H wherein R is a linear hydrocarbon chain, saturated and/or unsaturated, of 8 to 22 carbon atoms, n being an integer from 1 to 5, with formic acid.

15 Claims, No Drawings

USE OF ORGANOGELATOR DERIVATIVES IN BITUMINOUS COMPOSITIONS TO IMPROVE THE RESISTANCE OF SAME TO CHEMICAL STRESS

CROSS-REFERENCE TO RELATED APPLICATIONS

This application is a National Phase Entry of International Application No. PCT/IB2011/051908, filed on Apr. 29, 2011, which claims priority to European Patent Application Serial No. 10161698.5, filed on Apr. 30, 2010, both of which are incorporated by reference herein.

TECHNICAL FIELD

The present invention belongs to the field of bitumens. More specifically, it relates to the use of derivatives of the organogelator type in bituminous compositions in order to improve their resistance to chemical aggressions.

BACKGROUND

The use of bituminous compositions, notably of cross-linked bitumen/polymer compositions, is known, as coatings of diverse surfaces and, in particular, as road surfacings, provided that these compositions as a combination have a certain number of characteristics, notably mechanical characteristics. In order to maintain and/or improve the characteristics and notably the mechanical properties of a conventional bitumen, bituminous compositions have been used for a long time in which the bitumen (formed with one or several types of bitumens) is mixed with one or more functional polymers, notably styrene and butadiene elastomers, these elastomers being optionally chemically cross-linked in situ, optionally with a coupling or cross-linking agent, for example sulfur or at least one of its precursors.

Optimized mechanical characteristics are notably crucial for road surfacing applications. Beyond mechanical properties, for bitumens, their sensitivity to certain chemical agents should be taken into account. These aggressive chemical agents may for example be hydrocarbon solvents, in particular petroleum solvents such as kerosines, gasoils and/or gasolines or even products, in particular fluids, used for deicing and/or defrosting and/or removing snow from aircraft and taxiing areas. These fluids are for example aqueous potassium, sodium, magnesium and/or calcium saline solutions and/or compositions based on ethylene glycol and/or based on propylene glycol.

The aggressive effect of such chemical agents cumulates with the constraints of intense traffic, notably of heavy vehicles, and of bad weather, which has the detrimental effect of increasing rapid degradation of the roadways, in particular aeronautical roadways. This sensitivity of bitumens to aggressive chemical agents, to chemical aggressions is more specifically a nuisance for bitumens for example making up tarmacs and airport strip surfacings, which are made in bituminous coatings (bitumen/aggregates aggregate). Indeed, these tarmacs and airport surfacings are frequently soiled with kerosine drippings, during the filling of aircraft tanks, by leaks or other accidental spills of petroleum products. In addition, they are also exposed to various fluids used in cold weather for removing ice, frost and/or snow on aircraft and on the strips.

Surfacings of filling stations as well as of industrial premises of hydrocarbon depots may also be subject to this same problem of resistance of bituminous coatings to aggressive chemical agents which are hydrocarbon solvents and/or deicing/defrosting/snow removal fluids. Conventional roadways are naturally also exposed to this type of chemical aggressions.

In order to attempt to find a remedy to this, incorporation of various additives into the bitumens was proposed. Thus, patent EP1311619 describes the use of waxes in bitumens in order to improve their resistance to hydrocarbons. The waxes are in particular synthetic waxes stemming from the Fischer Tropsch synthesis process.

The applicant corporation proposed in patent application EP1756228 the incorporation to bitumen of polyamines with fatty chains, preferably polyamines with fatty chains obtained by reacting polyalkylene polyamines with fat chains of general formula R—NH—(CH$_2$—CH$_2$—CH$_2$—NH)$_n$—H wherein R represents a linear, saturated and/or unsaturated hydrocarbon chain, with 8 to 22 carbon atoms, n is an integer from 1 to 5, with formic acid in order to improve their resistance to chemical aggressions and in particular to hydrocarbons. These compositions are excluded from the present invention.

The applicant corporation also proposed in patent EP1572807 the incorporation to bitumen of functionalized olefin polymers selected from random terpolymers of ethylene, of alkyl acrylate or methacrylate and glycidyl acrylate or methacrylate, in order to improve resistance to petroleum solvents. Patent EP0900253 describes the use of copolymers of ethylene and of vinyl acetate in bitumen for improving resistance to kerosene.

SUMMARY

In pursuing their works, the applicant corporation surprisingly discovered that another type of additive, customarily used for other applications, gave the possibility of increasing the resistance of bituminous compositions to aggressive chemical agents, in particular to hydrocarbons, such as gasolines, kerosines and/or gasoils. Thus, the applicant corporation noticed that the use in a bituminous composition of an organogelator derivative having a molar mass of less or equal to 2,000 gmol$^{-1}$ and comprising at least one donor of hydrogen bonds D, at least one acceptor of hydrogen bonds A and at least one compatibilizer C in the bitumen, said compatibilizer C comprising a group selected from:
 at least one linear hydrocarbon chain comprising at least 4 carbon atoms, or
 at least one aliphatic cycle with 3 to 8 atoms, or
 at least one aromatic cycle, or
 at least one aliphatic or partly aromatic or further entirely aromatic fused polycyclic system, each cycle comprising 5 to 6 atoms, taken alone or as a mixture, gave the possibility of increasing the resistance of bituminous compositions to chemical aggressions such as those caused by hydrocarbons such as fuels, kerosines and/or gasoils, or by deicing/defrosting/snow removal products.

Bituminous compositions comprising such additives are known as such in application WO2008107551 of the applicant corporation. The applicant corporation has now discovered a new use for the compositions.

SHORT DESCRIPTION

The invention relates to the use of at least one organogelator derivative in a bituminous composition for improving resistance to aggressive chemical agents of said bituminous composition, said derivative having a molar mass of less than or equal to 2,000 g·mol$^{-1}$ and comprising at least one donor of hydrogen bonds D, at least one acceptor of hydrogen bonds A and at least one compatibilizer C in the bitumen, said compatibilizer C comprising a group selected from:

- at least one linear hydrocarbon chain comprising at least 4 carbon atoms, or
- at least one aliphatic cycle with 3 to 8 atoms, or
- at least one aromatic cycle, or
- at least one aliphatic, or partly aromatic, or still entirely aromatic fused polycyclic system, each cycle comprising 5 or 6 atoms, taken alone or as a mixture, excluding N,N'-ethylene bis(stearamide) and excluding fatty-chains polyamines obtained by reacting polyalkylene polyamines with fatty chains of general formula R—NH—(CH$_2$—CH$_2$—CH$_2$—NH)$_n$—H wherein R represents a saturated and/or unsaturated linear hydrocarbon chain, with 8 to 22 carbon atoms, n being an integer from 1 to 5, with formic acid.

Preferably, the donor D comprises a heteroatom bearing a hydrogen atom, selected from nitrogen N, oxygen O and/or sulfur S. Preferably, the acceptor A comprises a heteroatom bearing electron doublets, selected from oxygen O, sulfur S, nitrogen N and/or phosphorus P.

In a first embodiment, the organogelator derivative has the general formula (I):

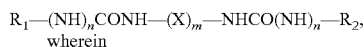
wherein at least one of the groups R$_1$, R$_2$ and/or X represents independently of each other the compatibilizer C, n and m are integers having a value of 0 or 1 independently of each other.

Preferably, n and m have a value of 0 and R$_1$ and/or R$_2$ represent independently of each other at least one linear hydrocarbon chain comprising at least 4 carbon atoms, preferably from 4 to 22 carbon atoms. Preferably, n and m have a value of 0 and R$_1$ and/or R$_2$ represent independently of each other at least one aromatic cycle, preferably a benzene ring or a substituted benzene ring. Preferably, the organogelator derivative is 2',3-bis[[3-[3,5-di-tert-butyl-4-hydroxyphenyl]propionyl]]propionohydrazide.

In a second embodiment, the organogelator derivative has the general formula (II):

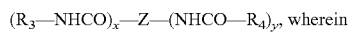

at least one of the groups R$_3$, R$_4$ and/or Z represents independently of each other the compatibilizer C, x and y are different integers with a value ranging from 0 to 3 and such that x+y=3.

In a third embodiment, the organogelator derivative has the general formula (III) wherein at least one of the groups R$_5$ and/or R$_6$ represents independently of each other the compatibilizer C:

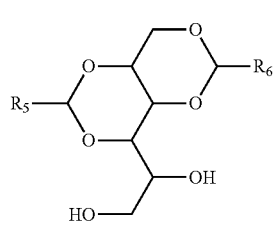

Preferably, R$_5$ and/or R$_6$ represent independently of each other an aromatic cycle, preferably a benzene ring or a substituted benzene ring. Preferably, the organogelator derivative is 1,3:2,4-di-O-benzylidene-D-sorbitol.

In a fourth embodiment, the organogelator derivative has the general formula (IV) R$_7$—(COOH)$_z$ with R$_7$ which represents the compatibilizer C and z is an integer ranging from 2 to 4. Preferably, z is equal to 2 and R$_7$ represents a linear hydrocarbon chain comprising at least 4 carbon atoms, preferably from 4 to 22 carbon atoms. Preferably, the organogelator derivative is selected from the following diacids: adipic acid, pimelic acid, suberic acid, azelaic acid, sebacic acid, undecanedioic acid, 1,2-dodecanedioic acid or tetradecanedioic acid, taken alone or as a mixture.

In a fifth embodiment, the organogelator derivative has the general formula (V):

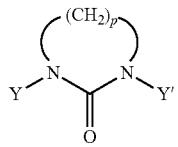

wherein the groups Y and/or Y' represents independently of each other, a hydrogen atom or a group selected from —(CH$_2$)$_q$—CH$_3$, —(CH$_2$)$_q$—NH$_2$, —(CH$_2$)$_q$—OH, —(CH$_2$)$_q$—COOH or

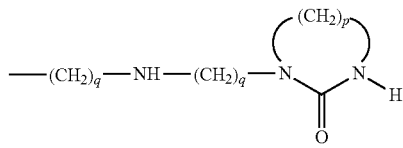

with q being an integer ranging from 2 to 18, preferably from 2 to 10, preferably from 2 to 4 and p being an integer greater than or equal to 2, preferably having a value of 2 or 3, it being preferably understood that Y and Y' cannot represent the group —(CH$_2$)$_q$—CH$_3$, simultaneously.

In a sixth embodiment, the organogelator derivative has the general formula (VI): R$_8$—NH—CO—CO—NH—R$_9$ with R$_8$ and/or R$_9$ which represent independently of each other the compatibilizer C. Preferably, the organogelator derivative has a molar mass of less than or equal to 1,000 g·mol$^{-1}$. Preferably, the bituminous composition comprises from 0.1 to 20% by mass of the organogelator derivative, preferably from 0.2 to 15%, more preferentially from 0.5 to 10%, still more preferentially from 1 to 5%.

Preferably, the bituminous composition further comprises at least one polymer. Preferably, the polymer is a copolymer of a monovinylaromatic hydrocarbon and of a conjugate diene, preferably styrene and butadiene. Preferably, the copolymer of a monovinylaromatic hydrocarbon and of a conjugate diene has a content of 1-2 double bond units derived from the conjugate diene comprised between 5% and 50% by mass, based on the total mass of the conjugate diene units, preferably between 10% and 40%, more preferentially between 15% and 30%, still more preferentially between 20% and 25%, still more preferably between 18% and 23%.

Preferably, the bituminous composition comprises a cross-linking agent. Preferably, the aggressive chemical agents are hydrocarbons, in particular petroleum hydrocarbons, such as kerosines, gasolines and/or gasoils. Preferably, the aggressive chemical agents are products used for deicing, defrosting and/or snow removal, such as saline solutions and/or compositions based on ethylene glycol and/or based on propylene glycol. Preferably, it is a question of improving the resistance to aggressive chemical agents of the bituminous composition when the latter is used in a roadway application as a surface layer. Preferably, it is a question of improving the resistance to aggressive chemical agents of the bituminous composition when the latter is in a mixture with aggregates in a bituminous mix.

DETAILED DESCRIPTION

By organogelator in the sense of the invention, is meant an association of several organogelator derivatives with identical or different chemical structure. In bitumen, these organogelator derivatives are capable of establishing between them physical interactions leading to self-aggregation with formation of a supra-molecular 3D lattice which is responsible for gelling of the bitumen. The stack of organogelator derivatives results in the formation of a lattice of fibrils immobilizing the bitumen molecules.

At the temperatures of use ranging from 10 to 60° C., the organogelator derivatives bind together in a non-covalent way, notably through hydrogen bonds. These hydrogen bonds disappear when the bitumen is heated to a high temperature. Thus, at the temperatures of use, the organogelator consisting of a large number of organogelator molecules may be assimilated to a "supramolecular" polymer and imparts to the thereby modified bitumen the properties of a conventional bitumen/polymer composition, notably as regards hardness. At the temperatures of use, the gelling due to the aggregation of the organogelator derivatives causes thickening of the bituminous medium, leading to an increase in the hardness. The bitumen no longer flows under its own weight, its hardness at the temperatures of use is increased as compared with the initial bitumen alone without any organogelator additive. When the bituminous composition is heated, the interactions stabilizing the organogelator derivative disappear and the bitumen resumes the properties of non-additived bitumen, the viscosity of the hot bituminous composition again becomes that of the initial bitumen.

Quite surprisingly, it was found that these derivatives of the organogelator type also impart to the bituminous compositions increased resistance to chemical aggressions such as those caused by hydrocarbons such as gasolines, kerosines, and/or gasoils, or by the de-icing/defrosting/snow removal products. Within the scope of the invention, the organogelator derivative comprises several groups capable of establishing hydrogen bonds. In order to establish these hydrogen bonds, the organogelator derivative comprises at least one acceptor of hydrogen bonds A, at least one donor of hydrogen bonds D.

In order to be able to gel and coagulate the bitumen, the organogelator derivative has to be soluble in the bitumen under hot conditions. The main chemical constituents of the bitumen are asphaltenes and maltenes. Asphaltenes are notably heterocyclic compounds consisting of many aromatic cycles and multifused naphthene cycles. Maltenes as for them mainly consist of long paraffinic chains.

Therefore, the organogelator derivative according to the invention comprises at least one chemical group C compatibilizing the organogelator derivative with the chemical compounds of the bitumen. This compatibilizer C may comprise, taken alone or as a mixture, a group selected from:

at least one long hydrocarbon chain compatible with the maltene fraction of bitumen, i.e. a linear hydrocarbon chain comprising at least 4 carbon atoms, or at least one aliphatic, i.e. non-aromatic, cycle of 3 to 8 atoms compatible with the maltene fraction of the bitumen, or at least one aromatic cycle compatible with the asphaltene fraction of the bitumen, or at least one aliphatic, partly aromatic or entirely aromatic fused polycyclic system, compatible with the asphaltene fraction of bitumen, each cycle comprising 5 or 6 atoms.

The organogelator derivative therefore comprises at least one donor of hydrogen bonds D, at least one acceptor of hydrogen bonds A in order to be able to form hydrogen bonds between organogelator derivatives and at least one compatibilizer C comprising a group selected from:

at least one linear hydrocarbon chain comprising at least 4 carbon atoms, or at least one aliphatic cycle with 3 to 8 atoms, or at least one aromatic cycle, or at least one aliphatic, or partly aromatic or still entirely aromatic fused polycyclic system, each cycle comprising 5 or 6 atoms.

Preferably, the donor of hydrogen bonds D comprises a heteroatom bearing a hydrogen atom, selected from nitrogen N, oxygen O and/or sulfur S. Preferably, the acceptor of hydrogen bonds A comprises a heteroatom bearing electron doublets, selected from oxygen O, sulfur S, nitrogen N and/or phosphorus P. Preferably, the donor D may be selected from alcohol, thiol, phenol groups, primary amines, secondary amines, quaternary ammoniums, amides, ureas, hydrazides, carboxylic acids, oximes, hydrazones, imines, and their combinations.

Preferably, the acceptor A may be selected from $C=O$, $S=O$, $P=O$ or $N=O$ groups and linear or cyclic hydrocarbon groups containing in their hydrocarbon chain an oxygen O, sulfur S, nitrogen N or phosphorus P heteroatom. Preferably, the acceptor A is selected from the groups: alcohols, phenols, amides, esters, ureas, hydrazides, carboxylic acids, ketones, aldehydes, lactones, lactams, anhydrides, imides, sulfoxides, sulfones, sulfonates, sulfates, sulfites, sulfonic acids, sulfides, ethers, phosphines, phosphites, phosphonates, phosphates, nitrates or nitrites and combinations thereof. Preferably, the three units A, D and C are present in each organogelator derivative so that a gel may be formed in the bitumen phase.

Preferably, when the compatibilizer C is a linear hydrocarbon chain comprising at least 4 atoms, this linear hydrocarbon chain comprises from 4 to 22 carbon atoms, preferably from 5 to 21, more preferentially from 9 to 18, still more preferentially from 11 to 17. Preferably, this linear hydrocarbon chain is saturated and is selected from the following saturated linear hydrocarbon chains: $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ or $C_4H_8$, $C_5H_{10}$, $C_9H_{18}$, $C_{11}H_{22}$, $C_{12}H_{24}$, $C_{17}H_{34}$, $C_{18}H_{36}$, $C_{21}H_{42}$, $C_{22}H_{44}$. Preferably, when the compatibilizer C is an aromatic cycle, this aromatic cycle is a benzene ring or a substituted benzene ring.

When the benzene ring is substituted, it is preferably substituted with at least one heteroatom, such as an oxygen, nitrogen, sulfur, fluorine, chlorine, bromine and/or iodine atom, and/or with at least one group selected from alkyl radicals with 1 to 18 atoms, preferably from 2 to 16 carbon atoms, more preferentially from 3 to 12 carbon atoms, still more preferentially from 4 to 8 carbon atoms. These substituents are in a para or ortho position, preferably in the para position. Preferably, the number of substituents on the benzene ring is from 1 to 5, more preferentially from 1 to 3, still more preferentially from 2 to 3.

Preferably, this aromatic cycle is a benzene ring substituted with at least one hydroxyl group and/or said alkyl radicals.

Preferably the hydroxyl group is in the para position and the alkyl radicals in the ortho position(s) relatively to the hydroxyl group(s). Preferentially, the aromatic cycle is a 3,5-dialkyl-4-hydroxyphenyl group and even better a 3,5-di-tert-butyl-4-hydroxyphenyl group.

More particularly, the organogelator derivative has the following general formula (I):

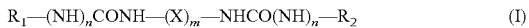

$$R_1—(NH)_n CONH—(X)_m—NHCO(NH)_n—R_2 \quad (I)$$

wherein:
at least one of the $R_1$, $R_2$ and/or X groups, independently of each other is the compatibilizer C as defined above,
n and m are integers independently of each other having a value of 0 or 1.

In the general formula (I), the acceptor of hydrogen bonds A is then an oxygen atom of an amide group (n=0, m=1), of a hydrazide group (n=0, m=0), of a urea group (n=1, m=1) or of a NH—CO—NH—NH—CO—NH group (n=1, m=0), In the general formula (I), the donor of hydrogen bonds D is then a nitrogen atom of an amide group (n=0, m=1), of a hydrazide group (n=0, m=0), of a urea group (n=1, m=1) or of a NH—CO—NH—NH—CO—NH group (n=1, m=0).

In a first embodiment, $R_1$ and/or $R_2$ represent independently of each other the compatibilizer C, preferably a linear hydrocarbon chain of at least 4 carbon atoms. More preferentially, $R_1$ and/or $R_2$ represent independently of each other, a linear hydrocarbon chain, comprising from 4 to 22 carbon atoms, preferably from 5 to 21, more preferentially from 9 to 18, still more preferentially from 11 to 17. More preferentially, the linear hydrocarbon chain is saturated and is selected from the following saturated linear hydrocarbon chains: $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

Preferably, X may also be a cyclohexyl group or a phenyl group, the radicals $R_1$—(NH)$_n$CONH— and NHCO(NH)$_n$—$R_2$— may then be in the ortho, meta or para position. Moreover, they may be in a cis or trans position relatively to each other. Further, when the radical X is cyclic, this cycle may be substituted with groups other than both main groups $R_1$—(NH)$_n$CONH— and —NHCO(NH)$_n$—$R_2$.

Preferably, X may also comprise two or more aliphatic and/or aromatic cycles either fused or not. Thus X is a group including two aliphatic cycles linked through an optionally substituted CH$_2$ group such as for example:

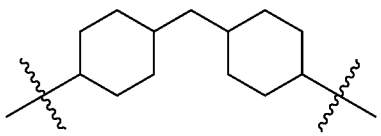 [SMILES: *C1CCC(CC2CCC(*)CC2)CC1]

X may also be a group including two aromatic cycles linked through an optionally substituted CH$_2$ group such as for example:

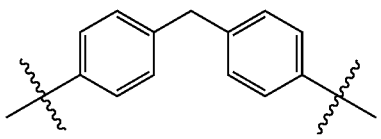 [SMILES: *c1ccc(Cc2ccc(*)cc2)cc1]

Preferably, the integers m and n have a value of 0. In this particular case, the general formula (I) is then written as $R_1$—CONH—NHCO—$R_2$, $R_1$ and/or $R_2$ being as defined above. The preferred organogelators are then hydrazide derivatives fitting the following formulae:

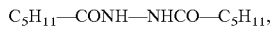

$C_5H_{11}$—CONH—NHCO—$C_5H_{11}$,

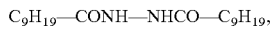

$C_9H_{19}$—CONH—NHCO—$C_9H_{19}$,

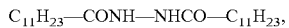

$C_{11}H_{23}$—CONH—NHCO—$C_{11}H_{23}$,

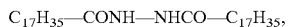

$C_{17}H_{35}$—CONH—NHCO—$C_{17}H_{35}$,

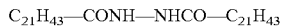

$C_{21}H_{43}$—CONH—NHCO—$C_{21}H_{43}$

In a second embodiment $R_1$ and/or $R_2$ represent independently of each other an aromatic cycle.

More preferentially, $R_1$ and/or $R_2$ represent independently of each other a benzene ring or a benzene ring substituted with at least one heteroatom, such as an oxygen, nitrogen, sulfur, fluorine, chlorine, bromine, and/or iodine atom and/or with at least one group selected from alkyl radicals comprising from 1 to 18 carbon atoms, preferably from 2 to 16 carbon atoms, more preferentially from 3 to 12 carbon atoms, still more preferentially from 4 to 8 carbon atoms. Preferably, the number of substituents on the benzene ring is from 1 to 5, more preferentially from 1 to 3, still more preferentially from 2 to 3.

Preferably, this aromatic cycle is a benzene ring substituted with at least one hydroxyl group and/or said alkyl radicals. Preferably, the hydroxyl group is in the para position and the alkyl radicals are in ortho position(s) relatively to the hydroxyl group(s). Preferentially, $R_1$ and/or $R_2$ represent independently of each other 3,5-dialkyl-4-hydroxyphenyl groups or still better 3,5-di-tert-butyl-4-hydroxyphenyl groups.

The hydrazide derivative of general formula (I) is for example:
2',3-bis[[3-[3,5-di-tert-butyl-4-hydroxyphenyl]propionyl]]propionohydrazide,
N,N'-hexane-1,6-diylbis(3-(3,5-di-tert-butyl-4-hydroxyphenylpropionamide)),
1,6-hexamethylene-bis(3-(3,5-di-tert-butyl-4-hydroxyphenyl)propionate.

The preferred hydrazide derivative of general formula (I) is:
2',3-bis[[3-[3,5-di-tert-butyl-4-hydroxyphenyl]propionyl]]propionohydrazide.

In a preferred alternative of the invention, the integer n has a value of 0 and m a value of 1. In this particular case, the general formula (I) is then written as $R_1$—CONH—X—NHCO—$R_2$, $R_1$, $R_2$ and/or X being as defined above. These are then diamide derivatives, from which the diamide, N,N'-ethylene bis(stearamide) $C_{17}H_{35}$—CONH—CH$_2$—CH$_2$—NHCO—$C_{17}H_{35}$, is excluded. In a preferred alternative of the invention, the integers n and m have a value of 1. In this particular case, the general formula (I) is then written as $R_1$—NHCONH—X—NHCONH—$R_2$, $R_1$, $R_2$ and/or X being as defined above. These are then ureide derivatives, including a particular urea, 4,4'-bis(dodecylaminocarbonylamino)diphenylmethane having the formula:

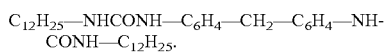

$C_{12}H_{25}$—NHCONH—$C_6H_4$—CH$_2$—$C_6H_4$—NH-
CONH—$C_{12}H_{25}$.

Still according to the invention, the organogelator derivative has the following general formula (II):

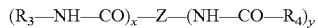

$$(R_3—NH—CO)_x—Z—(NH—CO—R_4)_y \quad (II)$$

wherein:
at least one of the groups $R_3$, $R_4$ and/or Z independently of each other is the compatibilizer C as defined above,
x and y are different integers with a value varying from 0 to 3 and such that x+y=3.

Preferably:
$R_3$ and/or $R_4$ represent independently of each other, a linear, branched or cyclic, saturated or unsaturated hydrocarbon chain comprising from 1 to 22 carbon atoms, optionally substituted, and optionally comprising heteroatoms, cycles and/or heterocycles;

Z is the compatibilizer C and represents an aromatic cycle selected from the following groups:

$Z_1$

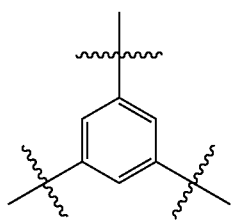

$Z_2$

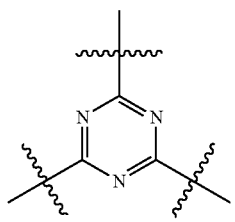

$Z_3$

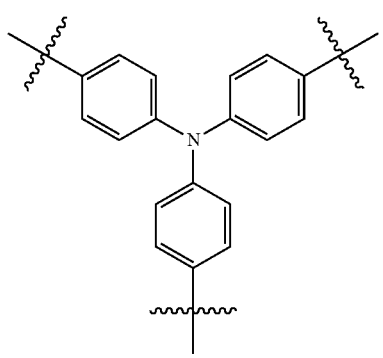

x and y are different integers with a value varying from 0 to 3 and such that x+y=3.

Preferably, x is equal to 0, y is equal to 3, $R_4$ represents a linear saturated hydrocarbon chain with 1 to 22 carbon atoms, preferably 2 to 18 carbon atoms, preferably 5 to 12 carbon atoms and Z represents $Z_2$. Preferably, x is equal to 0, y is equal to 3, $R_4$ represents the group $C_9H_{19}$ and Z represents $Z_2$, the N2, N4, N6-tridecylmelamine having the following formula:

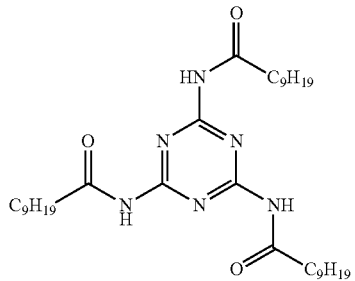

Preferably, x is equal to 3, y is equal to 0, Z represents $Z_1$ and $R_3$ is selected from the following groups either taken alone or as mixtures:

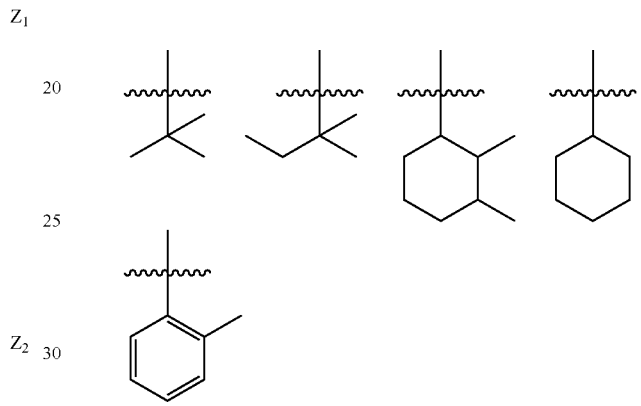

Preferably, x is equal to 3, y is equal to 0, Z represents $Z_1$ and $R_3$ represents a linear saturated hydrocarbon chain with 1 to 22 carbon atoms, preferably from 8 to 12 carbon atoms.

The donor of hydrogen bonds D then represents a nitrogen atom of an amide group. The acceptor of the hydrogen bond A then represents an oxygen atom of an amide group.

Still according to the invention, the organogelator derivative is a derivative of sorbitol and has the following general formula (III):

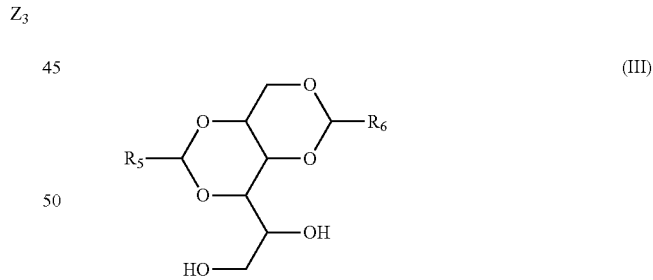

(III)

wherein $R_5$ and/or $R_6$ represent independently of each other the compatibilizer C as defined above.

The donor of hydrogen bonds D then represents an oxygen atom of an alcohol group OH. The acceptor of hydrogen bonds A then represents an oxygen atom. Preferably, $R_5$ and/or $R_6$ represent independently of each other an aromatic cycle.

More preferentially, $R_5$ and/or $R_6$ represent independently of each other a benzene ring or a benzene ring substituted with at least one heteroatom, such as an oxygen, nitrogen, sulfur, fluorine, chlorine, bromine and/or iodine atom and/or with at least one group selected from alkyl radicals with 1 to 18 atoms, preferably with 2 to 16 carbon atoms, more preferentially from 3 to 12 carbon atoms, still more preferentially from 4 to 8 carbon atoms. These substituents are in the para or ortho position, preferably in the para position. Preferably, the number of substituents on the benzene ring is from 1 to 5, more preferentially from 1 to 3, still more preferentially from 2 to 3.

Preferably, the groups $R_5$ and/or $R_6$ represent independently of each other, a non-substituted aromatic cycle, the derivative of general formula (III) is then 1,3:2,4-di-O-benzylidene-D-sorbitol or DBS. Preferably, the groups $R_5$ and/or $R_6$ represent independently of each other, an aromatic cycle substituted with a chlorine or bromine atom in the para position. The derivatives of general formula (III) are then:
  1,3:2,4-bis(p-chlorobenzylidene)sorbitol or,
  1,3:2,4-bis(p-bromobenzylidene) sorbitol.

Other derivatives of general formula (III) are for example the following derivatives:
  1,3:2,4-bis(p-methylbenzylidene)sorbitol,
  1,3:2,4-bis(3,4-dimethylbenzylidene)sorbitol,
  1,3:2,4-bis(p-ethylbenzylidene)sorbitol,
  1,3:2,4-bis(p-propylbenzylidene)sorbitol,
  1,3:2,4-bis(p-butylbenzylidene)sorbitol,
  1,3:2,4-bis(p-ethoxylbenzylidene)sorbitol.

By derivative of sorbitol, is meant any reaction product obtained from sorbitol, in particular, any reaction product obtained by reacting an aldehyde with sorbitol. Sorbitol acetal which are the preferred sorbitol derivatives are obtained by this condensation reaction. In particular, by reacting one mole of sorbitol and two moles of aldehydes, sorbitol deacetals of general formula (III) are obtained. The sorbitol diacetals of general formula (III) may also contain a certain amount of sorbitol monoacetals and of sorbital triacetals. For example when this is 1,3:2,4-di-O-benzylidene-D-sorbitol, it may also contain 2,4-mono-β-benzylidene-D-sorbitol (MBS) and 1,3:2,4:5,6-tri-O-benzylidene-D-sorbitol (TBS). Also, instead of sorbitol, the use of any other polyalcohol may be considered such as for example xylitol, mannitol and/or ribitol, in order to obtain xylitol, mannitol and/or ribitol diacetals.

Still according to the invention, the organogelator derivative has the following general formula (IV):

$$R_7\text{—(COOH)}_z \qquad \text{(IV)}$$

wherein:
  $R_7$ is the compatilizer C as defined above,
  z is an integer varying from 2 to 4.

The donor of hydrogen bonds D then represents an oxygen atom of an acid group COOH. The acceptor of hydrogen bonds A then represents an oxygen atom of an acid group COOH.

Preferably, $R_7$ represents a linear hydrocarbon chain comprising at least 4 carbon atoms, more preferentially a linear hydrocarbon chain comprising from 4 to 22 carbon atoms, preferably from 5 to 21 carbon atoms, more preferentially from 9 to 18 carbon atoms, still more preferentially from 11 to 17 carbon atoms. Preferably, this linear hydrocarbon chain is saturated. The organogelator derivatives fitting formula (IV) may be diacids, when z=2, triacids when z=3 or tetra-acids when z=4.

The preferred organogelator derivatives are diacids with z=2 of general formula HOOC—$R_7$—COOH, $R_7$ being the compatibilizer C as defined above. Preferably, the group $R_7$ is a saturated linear chain of formula $C_wH_{2w}$ with w an integer varying from 4 to 22, preferably from 5 to 21, more preferentially from 9 to 18, still more preferentially from 11 to 17.

The preferred diacids are the following:
  adipic acid or 1,6-hexanedioic acid with w=4,
  pimelic acid or 1,7-heptanedioic with w=5,
  suberic acid or 1,8-octanedioic acid with w=6,
  azelaic acid or 1,9-nonanedioic acid with w=7,
  sebacic acid or 1,10-decanedioic acid with w=8,
  undecanedioic acid with w=9,
  1,2-dodecanedioic acid with w=10,
  tetradecanedioic acid with w=12.

The diacids may also be diacid dimers of unsaturated fatty acid(s) i.e. dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels Alder reaction for example). Preferably, a single type of unsaturated fatty acid is dimerized. They in particular derive from dimerization of a notably $C_8$-$C_{34}$, notably $C_{12}$-$C_{22}$, in particular $C_{16}$-$C_{20}$, and more particularly $C_{18}$ unsaturated fatty acid. A preferred fatty acid dimer is obtained by dimerization of linoleic acid, the latter may then be partly or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. In the same way, triacids of fatty acids and tetraacids of fatty acids may be found, obtained by trimerization and tetramerization of at least one fatty acid, respectively.

Other organogelator derivatives have the following general formula (V):

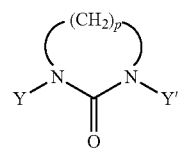

wherein, Y and/or Y' represent independently of each other, a hydrogen atom or a group selected from the following groups: —$(CH_2)_q$—$CH_3$, —$(CH_2)_q$—$NH_2$, —$(CH_2)_q$—OH, —$(CH_2)_q$—COOH or

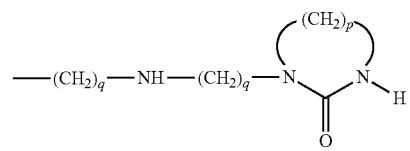

with q an integer varying from 2 to 18, preferably from 2 to 10, preferably from 2 to 4 and p an integer greater than or equal to 2, preferably with a value of 2 or 3, being preferably understood that Y and Y' cannot be the group —$(CH_2)_q$—$CH_3$ simultaneously. The groups H, —$(CH_2)_q$—$NH_2$, —$(CH_2)_q$—OH, —$(CH_2)_q$—COOH, or

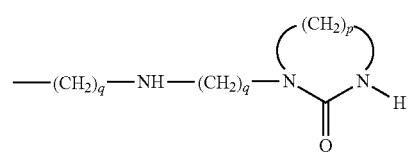

are preferred.

The compatibilizer C then represents an aliphatic cycle with 3 to 8 carbon atoms. The donor of hydrogen bonds D then represents a nitrogen atom of a urea group —NH—CO—NH—, of a urea group —NH—CO—N—, of an amine group —NH$_2$ or of an amine group —NH— or an oxygen atom of a group —OH or of an acid group COOH. The acceptor of hydrogen bonds A then represents an oxygen atom of a urea group —NH—CO—NH—, of a urea group —N—CO—NH—, of a urea group —N—CO—N— or of an acid group COOH.

Among the preferred organogelator derivatives fitting formula (V), mention may be made of the following compounds:

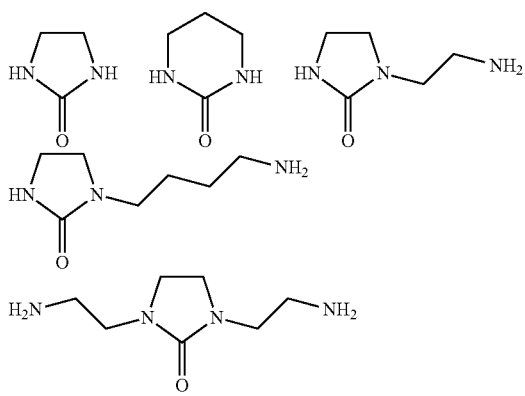

Still according to the invention, other derivatives have the following general formula (VI):

$$R_8—NH—CO—CO—NH—R_9 \quad (VI)$$

wherein $R_8$ and/or $R_9$ represent independently of each other the compatibilizer C as defined above. Preferably, $R_8$ and/or $R_9$ represent independently of each other a linear hydrocarbon chain of at least 4 carbon atoms. More preferentially, $R_8$ and/or $R_9$ represent independently of each other a linear hydrocarbon chain, comprising from 4 to 22 carbon atoms, preferably from 5 to 21, more preferentially from 9 to 18, still more preferentially from 11 to 17. More preferentially, the linear hydrocarbon chain is saturated and is selected from the following saturated linear hydrocarbon chains: $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$.

In the general formula (VI), the acceptor of hydrogen bonds A is then an oxygen atom of a group —NH—CO—CO—NH—. In the general formula (VI), the donor of hydrogen bonds D is then a nitrogen atom of a group —NH—CO—CO—NH—.

Still according to the invention, the organogelator derivative may also contain organogelator derivatives which do not all have the same chemical structure. Thus according to the invention, the organogelator derivative (VII) may contain at least two types of organogelator derivatives having a different chemical structure. When they are two types of organogelator derivatives, the three units A, D and C are again found globally in the organogelator derivative consisting of organogelator derivatives of different chemical structure, but distributed differently on both of these types of organogelator derivatives. Thus, if a type $T_1$ of organogelator derivatives and a second type $T_2$ are considered, $T_1$ may contain the units A and C and $T_2$ may contain the unit D. It is also possible to have the combination D+C in a first type $T_1$ of organogelator derivatives and A in a second type $T_2$ of organogelator derivatives. It is also possible to consider a first type $T_1$ having the three units A, D, C and a second type $T_2$ also having the three units A, C, D but based on a different chemical structure. The three units are not of the same chemical nature or not distributed in the same way on $T_1$ and $T_2$.

Among these organogelator derivatives (VII) comprising two types of organogelator derivatives, mention may be made of the combinations of the derivatives selected from amine derivatives, aminopyrimidine derivatives, or phenol derivatives associated with molecules selected from carboxylic acid derivative, barbituric acid derivatives or sulfosuccinate derivatives. Preferably, mention may be made of the combinations:

amine derivatives associated with carboxylic acid derivatives,
aminopyrimidine derivatives associated with barbituric acid derivatives,
phenol derivatives associated with sulfosuccinate derivatives.

Among these combinations, mention may notably be made of the association of 5-octyl-2,4,6-triaminopyrimidine and of 5,5-dioctylbarbituric acid or of the association of 5-octyl-2,4,6-triaminopyrimidine and of barbituric acid. Mention may also be made of the associations of 2-naphthol or tannic acid or lauryl gallate with sodium salts of dioctyl sulfosuccinate or dihexyl sulfosuccinate. One will not depart from the scope of the invention by combining several organogelator derivatives such as those mentioned earlier and notably organogelator derivatives of (I), (II), (III), (IV), (V), (VI) and (VII).

The organogelator derivative has a molar mass of less than or equal to 2,000 gmol$^{-1}$ and preferably less than or equal to 1,000 gmol$^{-1}$. In the bituminous composition, 0.1 to 20% by mass of organogelator derivative are used, preferably from 0.2 to 15%, more preferentially from 0.5 to 10%, still more preferentially from 1 to 5%, still more preferentially from 2 to 4%. The organogelator derivative is effective and this at very low concentrations, therefore one preferably operates with around 0.5% by mass of organogelator derivative, in the bituminous composition, for example at mass concentrations of 0.4%, 0.5%, 0.6% or 0.7%.

The bitumen used may be bitumen stemming from different origins. The bitumen which may be used according to the invention may be selected from bitumens of natural origin, such as those contained in deposits of natural bitumen, natural asphalt deposits or bituminous sands. The bitumen which may be used according to the invention may also be a bitumen or a mixture of bitumens originating from the refining of crude oil such as bitumens from direct distillation or bitumens from distillation under reduced pressure or also blown or semi-blown bitumens, residues from deasphalting with propane or pentane, viscobreaking residues, these different cuts being able to be used alone or as a mixture. The bitumens used may also be bitumens fluxed by adding volatile solvents, fluxes of petroleum origin, carbochemical fluxes and/or fluxes of vegetable origin. Synthetic bitumens also called clear, pigmentable or colorable bitumens, i.e. mixtures of oil and resin, said oil and/or resin being of petroleum origin and/or vegetable origin, may also be used. The bitumen may be a bitumen of naphthenic or paraffinic origin, or a mixture of both of these bitumens.

The bituminous composition may also comprise at least one polymer. The polymers which may be used according to the invention are polymers which may be conventionally used in the field of bitumens such as for example polybutadienes, polyisoprenes, butyl rubbers, polyacrylates, polymethacrylates, polychloroprenes, polynorbornenes, polybutenes, polyisobutenes, polyethylenes, copolymers of ethylene and vinyl acetate, copolymers of ethylene and methyl acrylate, copolymers of ethylene and butyl acrylate, copolymers of ethylene and maleic anhydride, copolymers of ethylene and glycidyl methacrylate, copolymers of ethylene and glycidyl acrylates, copolymers of ethylene and propene, ethylene/propene/diene terpolymers (EPDM), acrylonitrile/butadiene/styrene terpolymers (ABS), ethylene/alkyl acrylate or methacrylate/glycidyl acrylate or methacrylate terpolymers and notably ethylene/methyl acrylate/glycidyl methacrylate terpolymers and ethylene/alkyl acrylate or methacrylate/maleic anhydride terpolymers and notably ethylene/butyl acrylate/maleic anhydride terpolymers.

The preferred polymers are copolymers based on conjugate diene units and on monovinylaromatic hydrocarbon units, which may notably be cross-linked. The conjugate diene is preferably selected from those comprising from 4 to 8 carbon atoms, such as 1,3-butadiene (butadiene), 2-methyl-1,3-butadiene (isoprene), 2,3-dimethyl-1,3-butadiene, 1,3-pentadiene, 1,2-hexadiene, chloroprene, carboxylated butadiene and/or carboxylated isoprene. Preferably the conjugate diene is butadiene.

The monovinylaromatic hydrocarbon is preferably selected from styrene, o-methyl styrene, p-methyl styrene, p-tert-butyl styrene, 2,3-dimethyl styrene, α-methyl styrene, vinyl naphthalene, vinyl toluene and/or vinyl xylene. Preferably, the monovinyl hydrocarbon is styrene.

More particularly, the copolymer consists of one or more copolymers selected from monovinylaromatic hydrocarbon and conjugate diene copolymers, in particular copolymers of styrene and butadiene. These monovinylaromatic hydrocarbon and conjugate diene copolymers, in particular those of styrene and butadiene, may be linear or star-shaped. They may also be in the form of diblock, triblock copolymers and/or be with multiple branches. These monovinylaromatic and conjugate diene copolymers in particular those of styrene and butadiene, optionally comprise a random hinge.

Preferably, the copolymer is a diblock copolymer of a monovinylaromatic hydrocarbon and of a conjugate diene, in particular a diblock copolymer of styrene and butadiene, in particular a diblock copolymer of styrene and of butadiene having a random hinge. The copolymer of a monovinylaromatic hydrocarbon and conjugate diene, in particular of styrene and butadiene, has a weight average molecular mass $M_w$ comprised between 4,000 and 500,000 Daltons, preferably between 10,000 and 200,000, more preferentially between 50,000 and 150,000, still more preferentially between 80,000 and 130,000, still more preferentially between 100,000 and 120,000. The molecular mass of the copolymer is measured by GPC chromatography with a polystyrene standard according to the ASTM D3536 standard, replaced with the ASTM D5296-05 standard.

The copolymer of a monovinylaromatic hydrocarbon and conjugate diene, in particular of styrene and butadiene, advantageously has a weight content of monovinylaromatic hydrocarbon, in particular of styrene, ranging from 5% to 50% by mass, based on the copolymer mass, preferably from 20% to 40%. The copolymer of monovinylaromatic hydrocarbon and conjugate diene, in particular of styrene and butadiene, advantageously has a weight content of conjugate diene, in particular of butadiene, ranging from 50% to 95% by mass, based on the copolymer mass, preferably from 60% to 80%.

Among conjugate diene units, units with 1-4 double bonds derived from the conjugate diene and units with 1-2 double bonds derived from the conjugate diene are distinguished. By units with 1-4 double bonds derived from the conjugate diene, are meant units obtained via 1,4-addition during the polymerization of the conjugate diene. By units with 1-2 double bonds derived from the conjugate diene, are meant units obtained via 1,2-addition during the polymerization of the conjugate diene. The result of this 1,2-addition is a vinyl double bond, a so-called "pendant" bond.

The copolymer of a monovinylaromatic hydrocarbon and conjugate diene, in particular styrene and butadiene, has a content of units with 1-2 double bonds derived from the conjugate diene, in particular derived from butadiene, comprised between 5% and 50% by mass, based on the total mass of the conjugate diene units, in particular butadiene units, preferably between 10% and 40%, more preferentially between 15% and 30%, still more preferentially between 20% and 25%, even more preferentially between 18% and 23%. The copolymer of a monovinylaromatic hydrocarbon and conjugate diene, in particular of styrene and butadiene, having a content of units with 1-2 double bonds derived from the conjugate diene, in particular derived from butadiene as defined above, may be used with or without a cross-linking agent, since it has the property of being "self-cross-linking", the copolymer branches are cross-linked, bound together via these so-called "pendant" vinyl double bonds, without necessarily having to resort to the use of a cross-linking agent.

The bituminous composition comprises from 1% to 20% by mass of polymer, in particular of copolymer of monovinylaromatic hydrocarbon and conjugate diene, in particular of copolymer of styrene and butadiene, based on the mass bituminous composition, preferably from 2% to 10%, still more preferentially from 3% to 5%. The cross-linking of the polymer, in particular of the copolymer of a monovinylaromatic hydrocarbon and conjugate diene, in particular of the copolymer of styrene and butadiene, in the bituminous composition is achieved by using a polymer, in particular a copolymer of a monovinylaromatic hydrocarbon and conjugate diene, in particular a copolymer of styrene and butadiene, as defined above, and a cross-linking agent, or by using a polymer, in particular a copolymer of a monovinylaromatic hydrocarbon and conjugate diene, in particular a copolymer of styrene and of butadiene having a particular amount of units with 1-2 double bonds derived from the conjugate diene, in particular from butadiene, this amount of units with 1-2 double bonds derived from the conjugate diene, in particular from butadiene, being comprised between 5% and 50% by mass, based on the total mass of conjugate diene units, in particular butadiene units, preferably between 10% and 40%, more preferentially between 15% and 30%, still more preferentially between 20% and 25%, still more preferentially between 18% and 23%, or else further by using said polymer, in particular the copolymer of a monovinylaromatic hydrocarbon and conjugate diene, in particular the copolymer of styrene and butadiene, having the particular amounts of units with 1-2 double bonds derived from the conjugate diene, in particular from butadiene, in combination with a cross-linking agent.

Preferably, the cross-linking agent is selected from sulfur and polyhydrocarbyl polysulfides, taken alone or as a mixture, in the optional presence of vulcanization accelerators either sulfur donors or not sulfur donors, taken alone or as a mixture. The sulfur is notably sulfur flower or further crystallized alpha sulfur. The polyhydrocarbyl sulfides are for example selected from dihexyl disulfides, dioctyl disulfides, didodecyl disulfides, ditertiododecyl disulfides, dihexadecyl disulfides, dihexyl trisulfides, dioctyl trisulfides, dinonyl trisulfides, ditertiododecyl trisulfides, dihexadecyl trisulfides, diphenyl trisulfides, dibenzyl trisulfides, dihexyl tetrasulfides, dioctyl tetrasulfides, dinonyl tetrasulfides, ditertiodocecyl tetrasulfides, dihexadecyl tetrasulfides, diphenyl tetrasulfides, orthotolyl tetrasulfides, dibenzyl tetrasulfides, dihexyl pentasulfides, dioctyl pentasulfides, dinonyl pentasulfides, ditertiododecyl pentasulfides, dihexadecyl pentasulfides, dibenzyl pentasulfides, diallyl pentasulfides.

The vulcanization accelerators, donors of sulfur, may be selected from thiuram polysulfides, such as for example tetrabutylthiuram disulfides, tetraethyl thiuram disulfides, and tetramethyl thiuram disulfides, dipentamethylene thiuram disulfides, dipentamethylene thiuram tetrasulfides, or dipentamethylenethiuram hexasulfides. The vulcanization accelerators which are not sulfur donors and may be used according to the invention, may notably be selected from mercaptobenzothiazole and derivatives thereof, dithiocarbamates and derivatives thereof, and thiuram monosulfides and derivatives thereof, taken alone or as a mixture. Mention may be made as examples of vulcanization accelerators which are not sulfur donors, of zinc 2-mercaptobenzothiazole, zinc benzothiazolethiolate, sodium benzothiazolethiolate, benzothiazyl disulfide, copper benzothiazolethiolate, benzothiazyl N,N'-diethylthiocarbamyl sulfide, and benzothiazolsulfenamide, such as 2-benzothiazole diethyl sulphonamide, 2-benzothiazolepentamethylene sulfenamide, 2-benzothiazolecyclohexyl-sulfenamide, N-oxydiethylene 2-benzothiazolesulfenamide, N-oxydiethylene 2-benzothiazolethiosulfenamide, 2-benzothiazoledicyclohexyl-sulfenamide, 2-benzothiazolediisopropylsulfenamide, 2-benzothiazoletertiobutylsulfenamide, bismuth dimethyldithiocarbamate, cadmium diamyldithiocarbamate, cadmium diethyldithiocarbamate, copper dimethyldithiocarbamate, lead diamyl-dithiocarbamate, lead dimethyldithiocarbamate, lead pentamethylene-dithiocarbamate, selenium dimethyldithiocarbamate, tellurium diethyl-dithiocarbamate, zinc diamyldithiocarbamate, zinc dibenzyldithiocarbamate, zinc diethyldithiocarbamate, zinc dimethyldithiocarbamate, zinc dibutyldithiocarbamate, zinc pentamethylenedithiocarbamate, dipentamethylene-thiuram monosulfide, tetrabutylththiuram monosulfide, tetraethylthiuram monosulfide and tetramethylthiuram monosulfide.

The cross-linking agent may also be selected from compounds of general formula HS—R—SH wherein R represents a linear or branched, saturated or unsaturated hydrocarbon group with 2 to 40 carbon atoms, optionally comprising one or more heteroatoms, such as oxygen. Among the compounds fitting this general formula, mention may for example be made of 1,2-ethanedithiol, 1,3-propanedithiol, 1,4-butanedithiol, 1,5-pentanedithiol, 1,6-hexanedithiol, 1,7-heptanedithiol, 1,8-octanedithiol, bis-(2-mercaptoethyl)ether, bis-(3-mercaptoethyl)ether, bis-(4-mercaptoethyl)ether, (2-mercaptoethyl)(3-mercaptobutyl)ether, (2-mercaptoethyl)(4-mercaptobutyl)ether, 1,8-dimercapto-3,6-dioxaoctane, benzene-1,2-dithiol, benzene-1,3-dithiol, benzene-1,4-dithiol or toluene-3,4-dithiol, biphenyl-4,4'-dithiol.

An amount of cross-linking agent between 0.05% and 5% by mass, is generally used, based on the mass of the bituminous composition, preferably between 0.1% and 2%, more preferentially between 0.2% and 1%, still more preferentially between 0.3% and 0.5%. Preferably, the amounts of polymer and cross-linking agent are set so as to obtain a polymer/crosslinking agent ratio (or styrene and butadiene copolymer/crosslinking agent) comprised between 50:1 and 150:1, preferably between 60:1 and 100:1, more preferentially between 70:1 and 80:1.

The cross-linking of the bituminous compositions may be demonstrated by carrying out on these bituminous compositions, tensile tests according to the NF EN 13587 standard. Cross-linking bituminous compositions have a higher tensile strength than non-cross-linking bituminous compositions. A higher tensile strength results in a high ultimate elongation or maximum elongation ($\epsilon$ max in %), a high ultimate rupture stress or maximum elongation stress ($\sigma\epsilon$ max in MPa), a high conventional energy at 400% (E 400% in J/cm$^2$) and/or a high total energy (total E in J).

The bituminous compositions, in particular cross-linked bitumen/polymer compositions have a maximum elongation according to the NF EN 13587 standard, of greater than or equal to 400%, preferably greater than or equal to 500%, more preferentially greater than or equal to 600%, still more preferentially greater than or equal to 700%. The bituminous compositions, in particular the cross-linked bitumen/polymer compositions have a maximum elongation stress according to the NF EN 13587 standard, of greater than or equal to 0.4 MPa, preferably greater than or equal to 0.6 MPa, more preferentially greater than or equal to 0.8 MPa, still more preferentially greater than or equal to 1.2 MPa. The bituminous compositions, in particular the cross-linked bitumen/polymer compositions have a conventional energy at 400%, according to the NF EN 13587 standard, of greater than or equal to 3 J/cm$^2$, preferably greater than of equal to 5 J/cm$^2$, more preferentially greater than or equal to 10 J/cm$^2$, still more preferentially greater than or equal to 15 J/cm$^2$. The bituminous compositions, in particular the cross-linked bitumen/polymer compositions, have a total energy, according to the NF EN 13587 standard, of greater than or equal to 1 J, preferably greater than or equal to 2 J, more preferentially greater than or equal to 4 J, even more preferentially greater than or equal to 5 J.

The bituminous composition may also optionally comprise adhesion agents and/or surfactant agents. They are selected from derivatives of alkyl amines, derivatives of alkyl polyamines, derivatives of alkyl amidopolyamines, derivatives of alkyl amidopolyamines and derivatives of quaternary ammonium salts, taken alone or as a mixture. The most used are the tallow propylenes-diamines, tallow amido-amines, quaternary ammoniums obtained by quaternization of tallow propylenes-diamines, tallow propylenes-polyamines. The amount of adhesion agents and/or surfactant agents in the bituminous composition is comprised between 0.1% and 2% by mass, based on the mass of the bituminous composition, preferably between 0.2% and 1%. The bituminous composition may also optionally comprise at least one oil selected from oils of petroleum origin, of vegetable origin, and/or of animal origin.

The bituminous composition is prepared by mixing the organogelator derivative with the bituminous composition at a temperature from 100° C. to 220° C., preferably from 120° C. to 200° C., more preferentially from 140° C. to 180° C., still more preferentially between 160° C. and 170° C., for a duration from 30 minutes to 48 hours, preferably from 1 hour to 24 hours, more preferentially from 2 hours to 16 hours, still more preferentially from 4 hours to 8 hours. The different additional additives described above such as the polymers or the oils, may be added before or after the organogelator derivative under the same conditions of temperature and duration.

When the matter is to prepare a cross-linked bitumen/polymer composition, the cross-linked bitumen/polymer composition is first of all prepared without the organogelator derivative, by mixing the bitumen, the polymer, in particular the copolymer of a monovinylaromatic hydrocarbon and conjugate diene, in particular the copolymer of styrene and butadiene, and optionally the cross-linking agent at a temperature from 100° C. to 220° C., preferably from 120° C. to 200° C., more preferentially from 140° C. to 180° C., still more preferentially between 160° C. and 170° C., for a duration from 1 hour to 48 hours, preferably from 4 hours to 24 hours, more preferentially from 8 hours to 16 hours. When the bitumen/ polymer composition is cross-linked, the organogelator derivative is then added to the cross-linked bitumen/polymer composition at a temperature from 100° C. to 220° C., preferably from 120° C. to 200° C., more preferentially from 140° C. to 180° C., still more preferentially between 160° C. and 170° C., for a duration from 30 minutes to 48 hours, preferably from 1 hour to 24 hours, more preferentially from 2 hours to 16 hours, still more preferentially from 4 hours to 8 hours.

The bituminous compositions comprising the organogelator derivative are essentially intended for producing bituminous mixes or surface dressings for road applications. In the case of bituminous mixes, the bituminous compositions comprising the organogelator derivative are mixed with aggregates in order to provide bituminous mixes which are resistant to chemical aggressions, in particular resistant to hydrocarbons. The amount of bituminous composition comprising the organogelator derivative in the bituminous mix is comprised between 1 and 10% by mass, based on the mass of bituminous mix, preferably between 2 and 8%, more preferentially between 3 and 5%, the remainder being formed by the aggregates.

The bituminous mixes are used as a surface layer in areas where the surface may enter into contact with aggressive chemical agents, such as petroleum hydrocarbons or deicing, defrosting and/or snow removal products, for example due to discharges. Such surfaces for example comprise car parks, tarmacs and airport strips, filling stations, roundabouts, hydrocarbon depots. The organogelator derivative is used for improving the resistance of bituminous compositions to chemical aggressions generated by hydrocarbons, in particular petroleum hydrocarbons such as gasoline, fuels, high-octane fuels, kerosines, aviation fuels, gasoils, fuel oils. Also, the organogelator derivative is used for improving the resistance of the bituminous compositions to chemical aggressions generated by deicing, defrosting and/or snow removal products such as aqueous potassium, sodium, magnesium and/or calcium saline solutions, and/or compositions based on ethylene glycol and/or based on propylene glycol. The organogelator derivative is particularly effective for improving the resistance of the bituminous compositions to hydrocarbons, in particular to petroleum hydrocarbons such as gasolines, kerosines and/or gasoils.

EXAMPLES

The resistance to hydrocarbons of the bituminous compositions is evaluated according to an internal method close to the method used for measuring the Ball and Ring (softening) temperature of bitumens (EN 1427). The rings filled with bituminous compositions are placed in the supports customarily used in the EN 1427 method, 5 g balls are placed on these supports. The supports are placed in a beaker filled with kerosine, instead of water customarily used in the standard EN 1427 method. The resistance of the bituminous compositions to kerosine is evaluated at room temperature and with stirring. The duration, the softening time of two bituminous disks are evaluated until each ball, covered with bituminous compositions, moves down by a height of (25.0±0.4) mm. The problem of dissolution of bituminous compositions in kerosine is posed. The liquid in the beaker then becomes opaque, and it is impossible to visually determine whether the balls fall. We proceeded by inspection by taking out the supports at regular time intervals.

Different bituminous compositions are prepared from:
a bitumen with penetrability equal to 41 1/10 mm and a Ball and Ring temperature equal to 51.8° C.,
a diblock styrene and butadiene copolymer comprising 25% by mass of styrene, based on the mass of the copolymer, and 12% of units with a 1-2 double bond derived from butadiene, based on the mass of butadiene and a molecular mass $M_w$ of 115,000 daltons,
flower sulfur,
an additive of general formula (I) which is 2',3-bis[[3-[3,5-di-tert-butyl-4-hydroxyphenyl]propionyl]]propionohydrazide or Irganox MD1024 sold by Ciba,
an additive of general formula (III) which is 1,3:2,4-di-O-benzylidene-D-sorbitol or DBS,
an additive of general formula (III) which is 1,3:2,4-bis(p-chlorobenzylidene)sorbitol, or chlorinated DBS,
an additive of general formula (IV) which is sebacic acid,
in mass % amounts indicated in Table I below.

TABLE I

|  | Bituminous compositions | | | | | | |
| --- | --- | --- | --- | --- | --- | --- | --- |
|  | $T_1$ | $T_2$ | $C_1$ | $C_2$ | $C_3$ | $C_4$ | $C_5$ |
| Bitumen | 100 | 95.9 | 99.3 | 95.2 | 95.2 | 95.2 | 98.5 |
| SB copolymer | — | 4 | — | 4 | 4 | 4 | — |
| Sulfur | — | 0.1 | — | 0.1 | 0.1 | 0.1 | — |
| Irganox MD1024 | — | — | 0.7 | 0.7 | — | — | — |
| DBS | — | — | — | — | 0.7 | — | — |
| Chlorinated DBS | — | — | — | — | — | 0.7 | — |
| Sebacic acid | — | — | — | — | — | 0.7 | 1.5 |

The bituminous compositions are prepared in the following way:

For the bituminous compositions $C_1$ and $C_5$, a bitumen is introduced into a reactor maintained at 185° C. with stirring at 300 rpm. The content of the reactor is maintained at 185° C. with stirring at 300 rpm for 10 minutes. The additive of general formula (I) or (IV) is then introduced into the reactor. The content of the reactor is maintained at 185° C. with stirring at 300 rpm for 1 hour.

For the cross-linked bitumen/polymer composition $T_2$, the bitumen or the styrene/butadiene SB copolymer are introduced into a reactor maintained at 185° C. and with stirring at 300 rpm. The content of the reactor is then maintained at 185° C. with stirring at 300 rpm for 4 hours. The flower sulfur is then introduced into the reactor. The contents of the reactor is maintained at 185° C. with stirring at 300 rpm for 2 hours, and then at 185° C. with stirring at 150 rpm for 12 hours.

For the cross-linked bitumen/polymer compositions $C_2$ to $C_4$, it is proceeded in the same way as for the composition $T_2$ and the additive of general formula (I) or (III) is then introduced into the reactor. The content of the reactor is maintained at 185° C. with stirring at 300 rpm for 1 hour.

For the bituminous compositions $T_1$, $T_2$, $C_1$ to $C_5$, the following characteristics are determined:
1) penetrability at 25° C. noted as $P_{25}$ (1/10 mm) measured according to the EN 1426 standard,
2) the Ring and Ball and temperature noted as RBT (° C.) measured according to the EN 1427 standard,
3) the Pfeiffer index noted as PI defined by the formula below:

$$PI=1950-500\times\log(P_{25})-20\times RBT$$

$$50\times\log(P_{25})-RBT-120$$

4) elastic recovery noted as ER (%) measured at 25° C. according to the NF EN 13398 standard,
5) the time required for the ball to move down by a height of (25.0±0.4) mm, the results are recorded in Table II below,

TABLE II

| | Bituminous compositions | | | | | | |
|---|---|---|---|---|---|---|---|
| | $T_1$ | $T_2$ | $C_1$ | $C_2$ | $C_3$ | $C_4$ | $C_5$ |
| $P_{25}$ (1/10 mm) | 41.0 | 28.4 | 27.8 | 27.8 | 24.0 | 25.0 | 31.0 |
| RBT (° C.) | 51.8 | 74.0 | 56.2 | 96.0 | 82.0 | 66.6 | 109.5 |
| PI | −1.19 | 2.09 | 1.01 | 4.79 | 2.85 | 0.68 | 6.30 |
| ER(%) | — | 76 | — | 68 | 75 | 80 | — |
| Time (hours) | 0.5 | 1.5 | 8.5 | 12.5 | 7.0 | 8.0 | >24.0 |

It is seen that by using a derivative of the organogelator type, notably fitting the general formula (I), (III) or (IV) it is possible to significantly improve the resistance to kerosine of the bituminous compositions. Thus, the additived compositions $C_1$ and $C_5$ resist for 8 hours and 30 minutes or for more than 24 hours in the kerosine bath respectively while the control composition $T_1$ only resists for 30 minutes. Also, the additived compositions $C_2$, $C_3$ and $C_4$ resist for 12 hours and 30 minutes, 7 hours and 8 hours respectively in a kerosine bath while the control composition $T_2$ only resists for 1 hour and 30 minutes.

Hydrocarbon resistance tests are also carried out according to the EN 12697-43 standard on bituminous mixes. The bituminous mixes $EBT_1$, $EBT_2$ and $EBC_2$ respectively comprise 5.6% by mass of bituminous composition $T_1$, $T_2$ or $C_2$, based on the mass of the bituminous mix, and 94.4% by mass of aggregates (composition of the aggregates: 38% by mass of aggregates 6/10, based on the mass of the aggregates, 5% by mass of aggregates 4/6, 5% by mass of aggregates 2/4, 48% by mass of sand 0/2 and 4% by mass of fillers, void content 8.5-9.5%).

The bituminous mixes are prepared by mixing the bituminous compositions and the aggregates at 180° C. The tests are conducted according to the EN12697-43 standard in gasoil and in kerosine. The results are recorded in Table III below.

TABLE III

| Bituminous mixes | $EBT_1$ | $EBT_2$ | $EBC_2$ |
|---|---|---|---|
| Gasoil resistance 24 h (A/B) | 5/4 | 3/3 | 0/3 |
| Gasoil resistance 72 h (A/B) | — | 4/7 | 2/5 |
| Kerosine resistance 24 h (A/B) | 13/11 | 6/5 | 1/5 |
| Kerosine resistance 72 h (A/B) | — | 9/10 | 5/10 |

It is seen that that the bituminous mix $EBC_2$ is more resistant to gasoil and to kerosine than the bituminous mixes $EBT_1$ and $EBT_2$. Indeed, all the values A and B of the bituminous mix $EBC_2$ are less than or equal to those of the bituminous mixes $EBT_1$ and $EBT_2$ and the sum of the values A and B for the bituminous mix $EBC_2$ is much less than that for the bituminous mixes $EBT_1$ and $EBT_2$. The addition of the additive of general formula (I) in bitumen therefore very clearly improves the resistance of the bitumen towards gasoil and kerosine.

The invention claimed is:

1. A method for improving resistance to aggressive chemical agents of a bituminous composition, the method comprising adding at least one organogelator derivative to the bituminous composition and contacting the bituminous composition containing the organogelator with petroleum hydrocarbons, the at least one organogelator derivative having a molar mass of less than or equal to 2,000 g·mol$^{-1}$ and comprising at least one donor of hydrogen bonds D, at least one acceptor of hydrogen bonds A and at least one compatibilizer C in the bitumen, the compatibilizer C comprising a group selected from the group consisting of:

at least one linear hydrocarbon chain comprising at least 4 carbon atoms,
at least one aliphatic cycle with 3 to 8 atoms,
at least one aromatic cycle, and
at least one aliphatic or partly aromatic or further entirely aromatic fused polycyclic system, each cycle comprising 5 or 6 atoms, taken alone or as a mixture, excluding N,N'-ethylene bis(stearamide) and excluding fatty chain polyamines obtained by reacting polyalkylene polyamines with fatty chains of general formula R—NH—(CH$_2$—CH$_2$—CH$_2$—NH)$_n$—H wherein R represents a saturated and/or unsaturated linear hydrocarbon chain, with 8 to 22 carbon atoms, n being an integer from 1 to 5, with formic acid,
and said organogelator derivative is selected from the group consisting of:
  a compound of general formula (I): R$_1$—CONH—NHCO—R$_2$, wherein R$_1$ and/or R$_2$ represent the compatibilizer C and represent independently of each other at least one linear hydrocarbon chain comprising at least 4 carbon atoms, or at least one aromatic cycle,
  a compound of general formula (II): (R$_3$—NHCO)$_x$—Z—(NHCO—R$_4$)$_y$, wherein
  R$_3$ and/or R$_4$ represent independently of each other, a linear, branched or cyclic, saturated or unsaturated hydrocarbon chain comprising from 1 to 22 carbon atoms;
  Z represents the compatibilizer C,
  x and y are different integers with a value ranging from 0 to 3 and such that x+y=3;
  a compound of general formula (III):

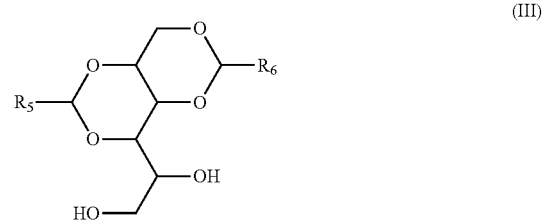

(III)

wherein at least one of the groups R$_5$ and/or R$_6$ represent the compatibilizer C and represent independently of each other an aromatic cycle,
a compound of general formula (IV): R$_7$—(COOH)$_z$, wherein R$_7$ represents the compatibilizer C and z being an integer varying from 2 to 4,
a compound of general formula (V):

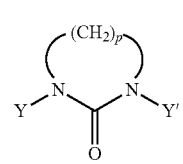

V wherein the groups Y and/or Y' represent independently of each other, a hydrogen atom or a group selected from the group consisting of: —(CH$_2$)$_q$—CH$_3$, —(CH$_2$)$_q$—NH$_2$, —(CH$_2$)$_q$—OH, —(CH$_2$)$_q$—COOH and

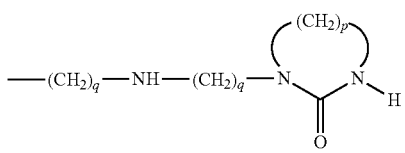

with q being an integer ranging from 2 to 18 and p being an integer greater than or equal to 2, with the proviso that Y and Y' cannot represent the group —$(CH_2)_q$—$CH_3$ simultaneously, and a compound of general formula (VI): $R_8$—NH—CO—CO—NH—$R_9$, wherein $R_8$ and/or $R_9$ represent the compatibilizer C and represent independently of each other a linear hydrocarbon chain of at least 4 carbon atoms.

2. The method according to claim 1, wherein the organogelator derivative is a compound of general formula (IV), wherein z is equal to 2 and $R_7$ represents a linear hydrocarbon chain comprising at least 4 carbon atoms.

3. The method according to claim 1, wherein the organogelator derivative has a molar mass of less than or equal to 1,000 g·mol$^{-1}$.

4. The method according to claim 1, wherein the bituminous composition comprises from 0.1 to 20% by mass of organogelator derivative.

5. The method according to claim 1, wherein the bituminous composition further comprises at least one polymer.

6. The method according to claim 1, wherein the bituminous composition comprises a cross-linking agent.

7. The method according to claim 1, for improving the resistance to aggressive chemical agents of the bituminous composition when the latter is utilized in a roadway application as a surface layer or when the latter is mixed with aggregates in a bituminous mix.

8. The method according to claim 5, wherein the polymer is a copolymer of a monovinylaromatic hydrocarbon and conjugate diene.

9. The method according to claim 8, wherein the copolymer of a monovinylaromatic hydrocarbon and conjugate diene has a content of units with 1-2 double bonds units derived from the conjugate diene comprised between 5% and 50% by mass, based on the total mass of the conjugate diene units.

10. The method according to claim 1, wherein the petroleum hydrocarbons are gasolines, kerosenes, gasoils, or mixtures thereof.

11. A method for improving resistance to petroleum hydrocarbons of a bituminous composition, the method comprising:

adding an organogelator derivative to a bitumen to generate a bituminous composition; and contacting the bituminous composition with petroleum hydrocarbons, wherein the organogelator derivative is selected from the group consisting of 2',3-bis[[3-[3,5-di-tert-butyl-4-hydroxyphenyl]propionyl]]propionohydrazide, 1,3:2,4-di-O-benzylidene-D-sorbitol, 1,3:2,4-bis(p-chlorobenzylidene)sorbitol, sebacic acid, and combinations thereof.

12. The method according to claim 11, wherein prior to contacting, the method comprises:

stirring the bitumen at 300 rpm and at a temperature of 185° C. in a reactor;

adding the organogelator derivative to the reactor containing the bitumen; and stirring the bitumen and organogelator derivative at 300 rpm and at a temperature of 185° C. to generate the bituminous composition.

13. The method according to claim 12, further comprising:
adding a diblock styrene and butadiene copolymer to the bitumen prior to adding the organogelator derivative.

14. The method according to claim 11, wherein it takes form 8 to 24 hours for a 5 gram ball to move downward with the bituminous composition to a distance of 25 mm when the 5 gram ball is placed on a ring of the bituminous composition and the bituminous composition and ball are submerged in kerosene.

15. The method according to claim 11, wherein the petroleum hydrocarbons are gasolines, kerosenes, gasoils, or mixtures thereof.

* * * * *